(12) United States Patent
Oba et al.

(10) Patent No.: US 10,998,781 B2
(45) Date of Patent: May 4, 2021

(54) ROTATING ELECTRIC MACHINE

(71) Applicant: DENSO CORPORATION, Kariya (JP)

(72) Inventors: Ryohei Oba, Kariya (JP); Nobuo Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 16/292,748

(22) Filed: Mar. 5, 2019

(65) Prior Publication Data

US 2019/0280538 A1    Sep. 12, 2019

(30) Foreign Application Priority Data

Mar. 9, 2018    (JP) ............................. JP2018-042860

(51) Int. Cl.
| | |
|---|---|
| *H02K 9/22* | (2006.01) |
| *H02K 1/24* | (2006.01) |
| *H02M 7/12* | (2006.01) |
| *H02K 1/16* | (2006.01) |
| *H02K 11/05* | (2016.01) |
| *H02M 7/00* | (2006.01) |
| *H02K 19/10* | (2006.01) |
| *H02K 11/04* | (2016.01) |
| *H02K 11/33* | (2016.01) |

(52) U.S. Cl.
CPC ............... *H02K 1/24* (2013.01); *H02K 1/16* (2013.01); *H02K 9/22* (2013.01); *H02K 11/048* (2013.01); *H02K 11/05* (2016.01); *H02K 11/33* (2016.01); *H02K 19/10* (2013.01); *H02M 7/003* (2013.01); *H02M 7/12* (2013.01)

(58) Field of Classification Search
CPC ...... H02K 11/00; H02K 11/04; H02K 11/048; H02K 11/05; H02K 11/33; H02K 1/16; H02K 1/24; H02K 9/00; H02K 9/22; H02K 19/00; H02K 19/10; H02M 7/00; H02M 7/003; H02M 7/12; H05K 7/20; B23P 15/26; F01P 11/08; F16N 39/02; F28F 3/02; F28F 13/00; F28F 1/12
See application file for complete search history.

(56) References Cited

U.S. PATENT DOCUMENTS

| | | | | |
|---|---|---|---|---|
| 4,669,535 | A * | 6/1987 | Seidler | ...................... F28F 3/02 165/185 |
| 2006/0118969 | A1* | 6/2006 | Yuan | ...................... H01L 23/16 257/778 |
| 2014/0070645 | A1* | 3/2014 | Maeda | ................. H02K 11/048 310/64 |
| 2014/0091683 | A1 | 4/2014 | Ito et al. | |
| 2017/0201162 | A1 | 7/2017 | Inokuchi | |

FOREIGN PATENT DOCUMENTS

JP            4500300 B2    7/2010

* cited by examiner

*Primary Examiner* — Tran N Nguyen
(74) *Attorney, Agent, or Firm* — Oliff PLC

(57) ABSTRACT

A rotating electric machine includes a rotor, a stator, a housing, a plurality of control modules and a joining member. The stator includes a stator coil. The housing accommodates both the rotor and the stator therein. The control modules are capable of supplying multi-phase alternating current to the stator coil and rectifying multi-phase alternating current generated in the stator coil into direct current. The control modules include a first control module and a second control module that are arranged adjacent to each other. The first and second control modules are joined, by the joining member, to be in surface contact with each other.

4 Claims, 8 Drawing Sheets

ROTATING ELECTRIC MACHINE

CROSS-REFERENCE TO RELATED APPLICATION

This application is based on and claims priority from Japanese Patent Application No. 2018-42860 filed on Mar. 9, 2018, the contents of which are hereby incorporated by reference in their entirety into this application.

BACKGROUND

1 Technical Field

The present disclosure relates to rotating electric machines.

2 Description of Related Art

There are known rotating electric machines that generate torque upon being supplied with electric power and generate electric power upon being supplied with torque.

For example, Japanese Patent Publication No. JP4500300B2 discloses a rotating electric machine that includes a machine main body, which includes a stator and a rotor, and a control section including a plurality of control modules.

Moreover, as one of tests for confirming the reliability of such a rotating electric machine as disclosed in the above patent document, a reverse connection test may be performed.

Specifically, in the reverse connection test, electric power of a relatively high voltage is supplied, from a battery electrically connected with a power supply terminal provided in one of the control modules, to the ground side of the control modules, thereby testing the reliably of the control section. Accordingly, in the reverse connection test, the most electric power is supplied to that one of the control modules which has the power supply terminal provided therein. Consequently, a relatively large amount of heat is generated in the control module having the power supply terminal provided therein.

To prevent thermal damage to the control section, one may consider setting the heat dissipation capability of the control module having the power supply terminal provided therein to be higher than or equal to a given level.

However, all the control modules of the control section generally have substantially the same configuration. Therefore, if the heat dissipation capability of the control module having the power supply terminal provided therein was set to be higher than or equal to the given level, the heat dissipation capabilities of the other control modules would also be set to be higher than or equal to the given level. Consequently, the total heat dissipation capability of the control section would become excessively high, resulting in an increase in the manufacturing cost of the control section.

SUMMARY

According to the present disclosure, there is provided a rotating electric machine which includes a rotor, a stator, a housing, a plurality of control modules and a joining member. The stator includes a stator coil. The housing accommodates both the rotor and the stator therein. The control modules are capable of supplying multi-phase alternating current to the stator coil and rectifying multi-phase alternating current generated in the stator coil into direct current. The control modules include a first control module and a second control module that are arranged adjacent to each other. The first and second control modules are joined, by the joining member, to be in surface contact with each other.

With the above configuration, when one of the first and second control modules undergoes abnormal heat generation exceeding the heat dissipation capability of the one of the first and second control modules, heat can be easily transferred from the one of the first and second control modules to the other of the first and second control modules. As a result, the one of the first and second control modules which undergoes the abnormal heat generation can be prevented from being damaged due to the abnormal heat generation.

DESCRIPTION OF EMBODIMENTS

Exemplary embodiments will be described hereinafter with reference to FIGS. 1-8. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 1:
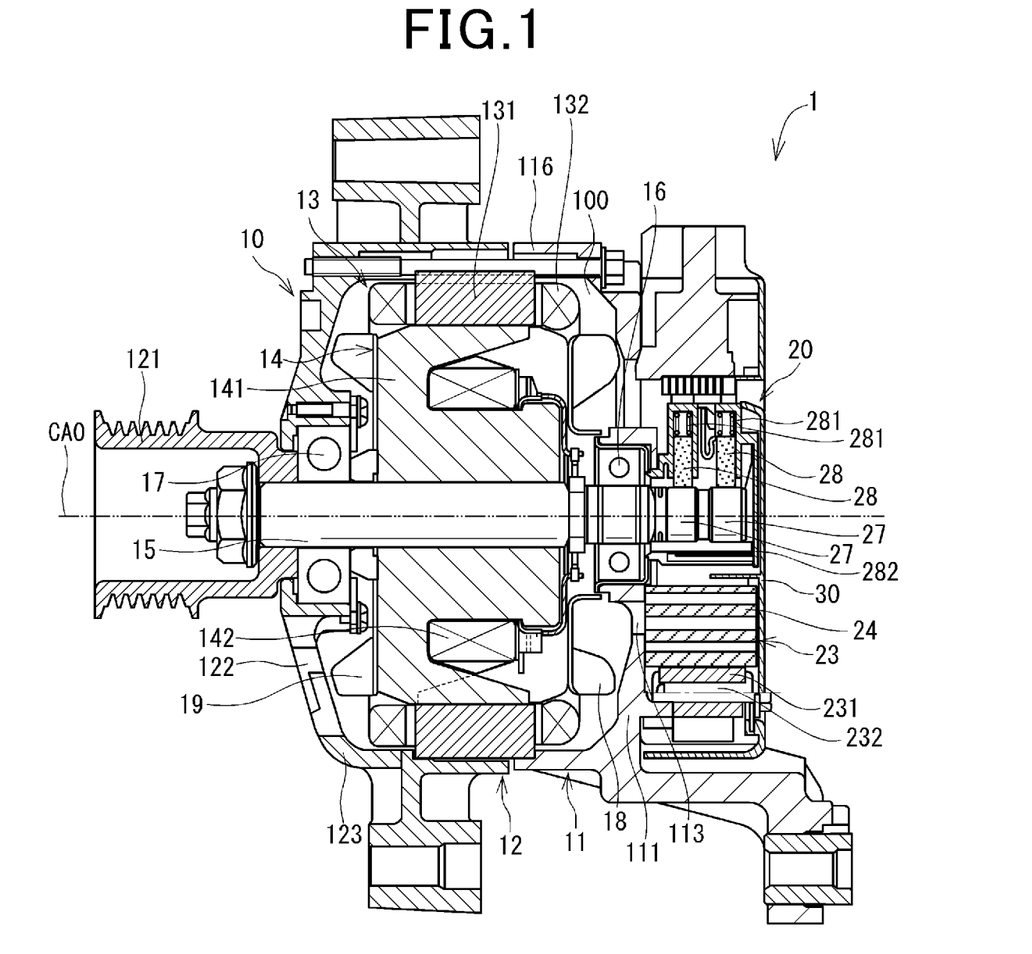
FIG. 1 is a cross-sectional view of a rotating electric machine according to a first embodiment.

FIG. 1 shows the overall configuration of a rotating electric machine 1 according to the first embodiment.

In the present embodiment, the rotating electric machine 1 is designed to be used in, for example, a vehicle. Moreover, the rotating electric machine 1 is configured as a motor-generator to selectively operate in a motor mode and a generator mode. In the motor mode, the rotating electric machine 1 generates, using electric power supplied from a battery 5 (see FIG. 2), drive power (or torque) for driving the vehicle. On the other hand, in the generator mode, the rotating electric machine 1 generates, using drive power supplied from an engine (not shown) of the vehicle, electric power for charging the battery 5.

As shown in FIG. 1, the rotating electric machine 1 includes a machine main body 10, a control section 20 and a cover 30.

The machine main body 10 is capable of generating torque upon being supplied with electric power and generating electric power upon being supplied with torque. The machine main body 10 includes a first frame 11, a second frame 12, a stator 13, a rotor 14, a rotating shaft 15, bearings 16 and 17, and cooling fans 18 and 19. In addition, the first and second frames 11 and 12 together correspond to a □housing□.

The first frame 11 is substantially cup-shaped (i.e., concave in shape). The first frame 11 has a bottom part 111 in which the bearing 16 is provided to rotatably support one end portion (i.e., a right end portion in FIG. 1) of the rotating shaft 15.

On the opposite side of the bottom part 111 to the second frame 12, i.e., on the outside of the first frame 11, there is provided the control section 20.

Figure 3:
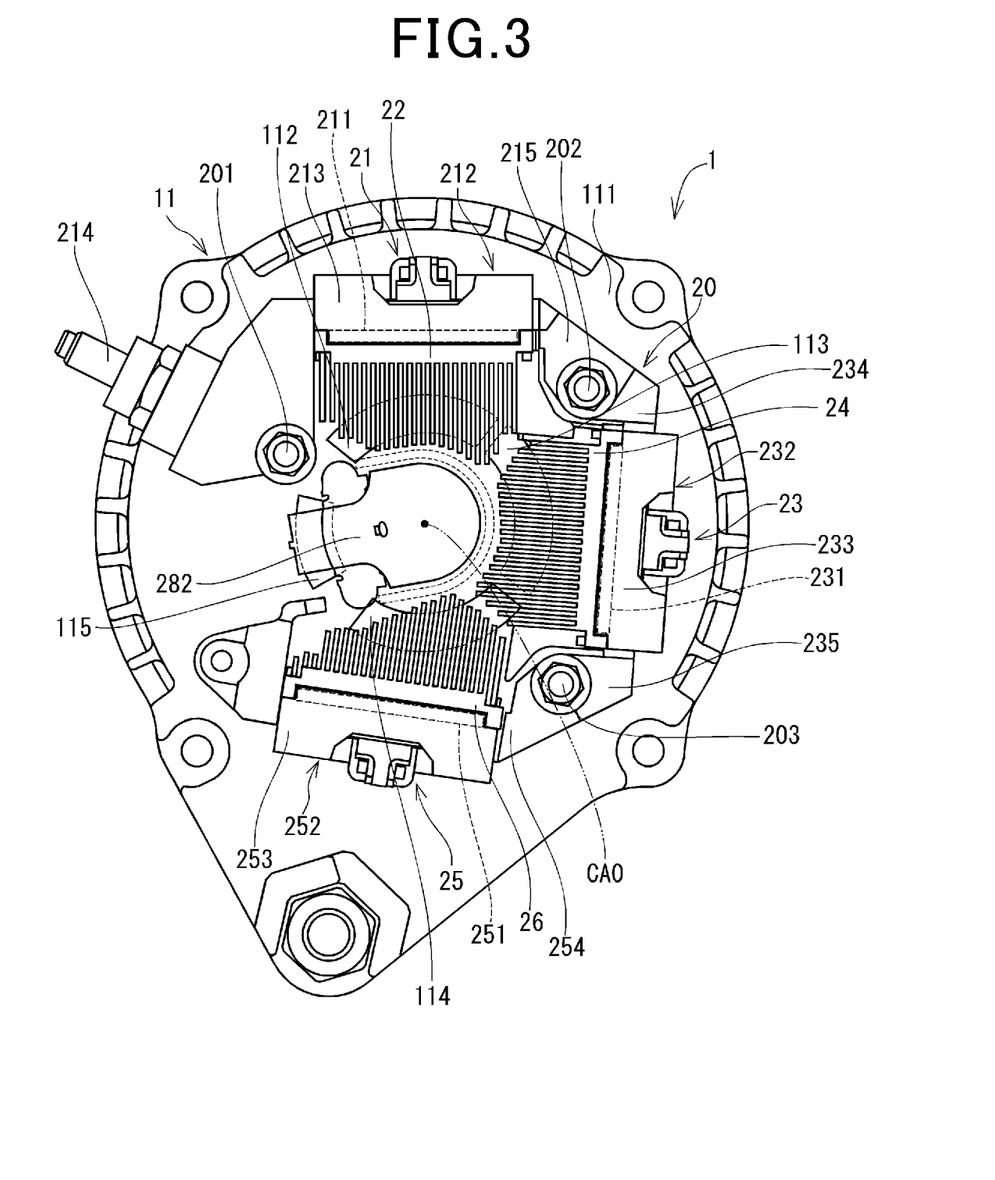
FIG. 3 is a schematic view of the rotating electric machine along the rotation axis of a rotating shaft of the machine from a cover side, omitting the cover and showing control modules of a control section of the machine.

As shown in FIG. 3, in the bottom part 111 of the first frame 11, there are formed four ventilation holes (i.e., through-holes) 112, 113, 114 and 115 through which cooling air can flow from the outside to the inside of the first frame 11. Moreover, of the four ventilation holes 112-115, the ventilation holes 112, 113 and 114 are located so that when viewed in a direction along a rotation axis CAO of the rotating shaft 15, the ventilation holes 112, 113 and 114 respectively overlap heat sinks 22, 24 and 26 provided in the control section 20. The heat sinks 22, 24 and 26 will be described later.

Referring back to FIG. 1, the second frame 12 is also substantially cup-shaped (i.e., concave in shape). The first and second frames 11 and 12 are arranged to have their openings communicating with each other. Consequently, in the first and second frames 11 and 12, there is formed an accommodation space 100 in which the stator 13, the rotor 14 and the rotating shaft 15 are accommodated. To a bottom part of the second frame 12, there is mounted a connection part (e.g., a pulley) 121 that can be mechanically connected with a crankshaft (not shown) of the engine. Moreover, in the bottom part of the second frame 12, there is provided the bearing 17 to rotatably support another end portion (i.e., a left end portion in FIG. 1) of the rotating shaft 15. In addition, in the bottom part of the second frame 12, there is formed a ventilation hole (i.e., through-hole) 122 through which cooling air can flow from the outside to the inside of the second frame 12.

The first frame 11 has a tubular part 116 that extends from the bottom part 111 of the first frame 11 toward the second frame 12. Similarly, the second frame 12 has a tubular part 123 that extends from the bottom part of the second frame 12 toward the first frame 11.

The stator 13 is provided radially inside both the tubular part 116 of the first frame 11 and the tubular part 123 of the second frame 12 and radially outside the rotor 14.

Figure 2:
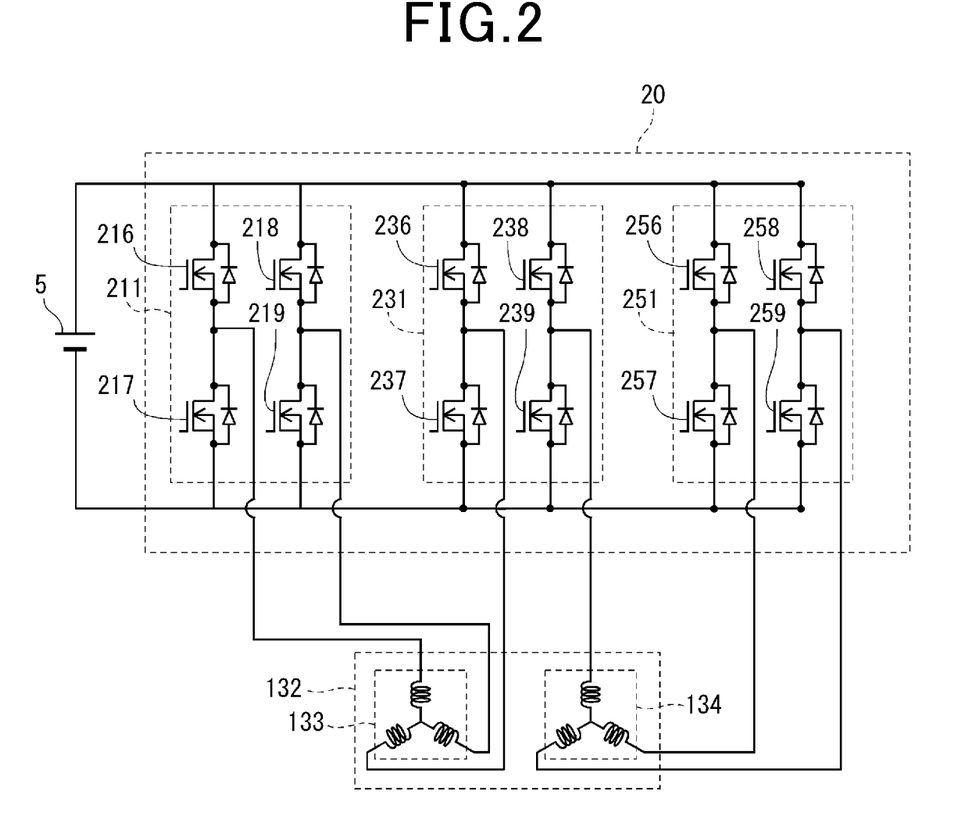
FIG. 2 is a circuit diagram of the rotating electric machine.

The stator 13 includes an annular stator core 131 and stator coils 132 wound on the stator core 131. More particularly, in the present embodiment, as shown in FIG. 2, the stator coils 132 consist of a first three-phase stator coil 133 and a second three-phase stator coil 134.

In addition, it should be noted that the number of phases of the stator coils 132 may alternatively be two, or four or more. It also should be noted that the number of the stator coils 132 included in the stator 13 may alternatively be one, or three or more.

In the motor mode of the rotating electric machine 1, the stator 13 creates a rotating magnetic field upon three-phase alternating current flowing in the stator coils 132. On the other hand, in the generator mode of the rotating electric machine 1, the stator 13 generates three-phase alternating current upon magnetic flux, which is generated by the rotor 14, crossing the stator coils 132.

The rotor 14 is rotatably provided radially inside the stator 13. The rotor 14 includes a rotor core 141 and a rotor coil 142 wound on the rotor core 141. The rotor 14 forms magnetic poles upon direct current (i.e., excitation current) flowing in the rotor coil 142.

The rotating shaft 15 is fixedly inserted in a center hole of the rotor core 141 so that the rotor 14 rotates together with the rotating shaft 15. In other words, the rotor 14 is fixed on the rotating shaft 15 to rotate together with the rotating shaft 15. As described previously, the end portions of the rotating shaft 15 are rotatably supported respectively by the bearings 16 and 17. In addition, the rotating shaft 15 rotates about the rotation axis CAO thereof.

The cooling fan 18 is fixed to a first frame 11-side end surface of the rotor core 141, and thus located between the rotor core 141 and the bearing 16 in the direction of the rotation axis CAO of the rotating shaft 15. On the other hand, the cooling fan 19 is fixed to a second frame 12-side end surface of the rotor core 141, and thus located between the rotor core 141 and the bearing 17 in the direction of the rotation axis CAO of the rotating shaft 15. That is, both the cooling fans 18 and 19 are provided so as to rotate together with the rotor 14 and the rotating shaft 15, thereby producing a flow of the cooling air for cooling the rotating electric machine 1.

The control section 20 is provided outside the machine main body 10. More specifically, the control section 20 is located on the opposite side of the bottom part 111 of the first frame 11 to the accommodation space 100.

The control section 20 includes a first control module 21, a second control module 23, a third control module 25, a pair of slip rings 27 and a pair of brushes 28.

In the motor mode of the rotating electric machine 1, the control section 20 controls the supply of electric power from the battery 5 to the machine main body 10. On the other hand, in the generator mode of the rotating electric machine 1, the control section 20 rectifies three-phase alternating current generated in the machine main body 10 into direct current and supplies the resultant direct current to the battery 5.

The first control module 21 is an assembly of components for forming a first inverter circuit and a first rectification circuit of the rotating electric machine 1. As shown in FIG. 3, the first control module 21 includes a power module 211, the aforementioned heat sink 22, and a busbar assembly 212.

The power module 211 is a switching element module which includes four switching elements for forming the first inverter circuit and the first rectification circuit, more particularly four MOSFETs 216, 217, 218 and 219 as shown in FIG. 2 in the present embodiment. The MOSFETs 216 and 217 are electrically connected in series with each other such that the source of the MOSFET 216 is electrically connected to the drain of the MOSFET 217. Similarly, the MOSFETs 218 and 219 are electrically connected in series with each other such that the source of the MOSFET 218 is electrically connected to the drain of the MOSFET 219.

As shown in FIG. 3, the heat sink 22 is provided on the rotation axis CAO side of the power module 211, i.e., on the radially inner side of the power module 211. In other words, the heat sink 22 is located closer than the power module 211 to the rotation axis CAO of the rotating shaft 15. The heat sink 22 is made of metal and configured to dissipate heat generated in the power module 211. More specifically, as shown in FIG. 4, the heat sink 22 is configured to have a base part 221, a plurality of fins 222 and a contact part 223.

The base part 221 is plate-shaped and has a larger thickness than each of the fins 222. The base part 221 is provided, on the rotation axis CAO side (i.e., on the radially inner side) of the power module 211, to abut the power module 211.

The fins 222 are formed on the rotation axis CAO side of the base part 221. As shown in FIG. 3, the fins 222 are substantially plate-shaped and arranged parallel with each other in a direction substantially perpendicular to the rotation axis CAO of the rotating shaft 15 with gaps formed therebetween.

Figure 4:
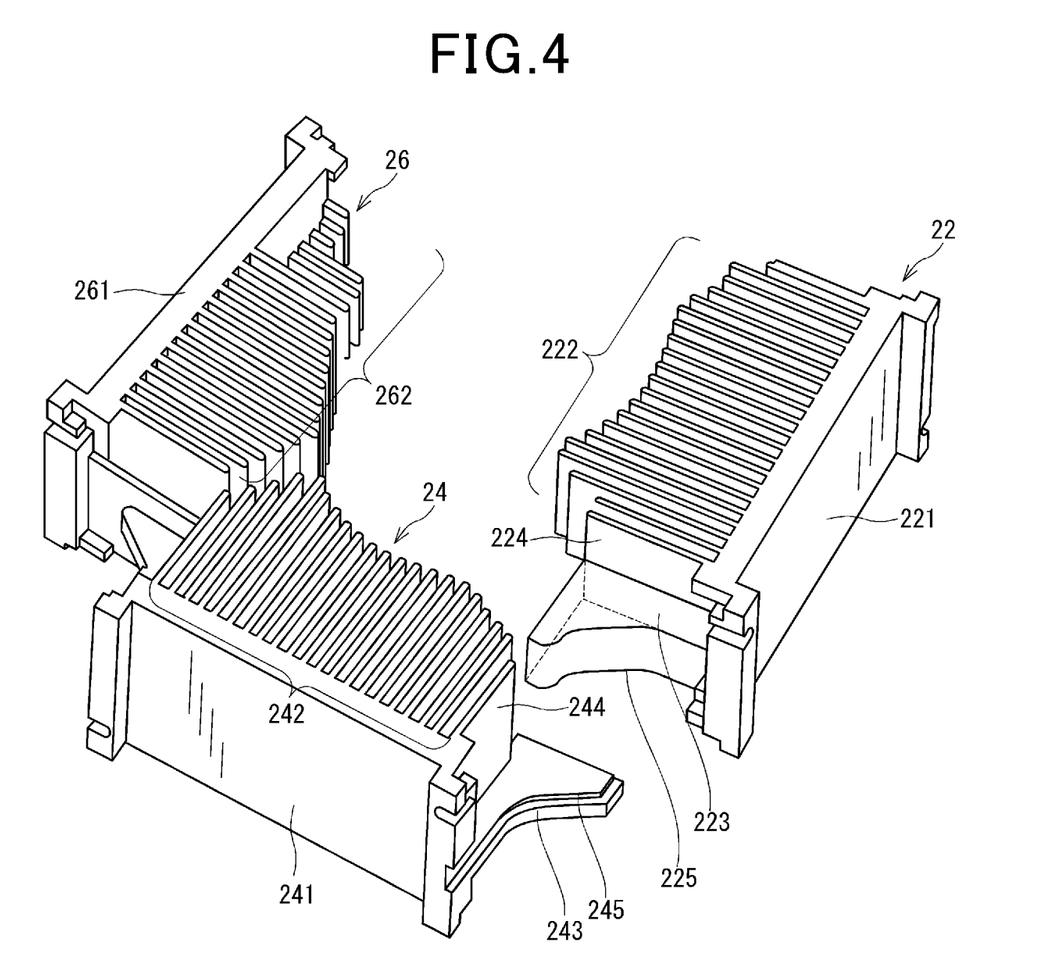
FIG. 4 is a perspective view of heat sinks employed in the rotating electric machine.

As shown in FIG. 4, the contact part 223 is formed on the second control module 23 side of that one of the fins 222 which is located closest to the second control module 23 in the fins 222. In addition, for the sake of facilitating understanding, that one of the fins 222 which is located closest to the second control module 23 in the fins 222 is designated by the reference numeral 224 in FIG. 4.

The contact part 223 has a contact surface 225 for making contact with a contact part 243 of the heat sink 24 of the second control module 23 which will be described in detail later.

The busbar assembly 212 is an assembly of components for insulating and wiring the power module 211. The busbar assembly 212 includes a busbar (not shown) electrically connected with the power module 211, a sealing part 213, a power supply terminal 214 and a connection part 215.

The sealing part 213 is formed of resin to fix and seal the busbar of the busbar assembly 212.

The power supply terminal 214 is provided on one side (i.e., the left side in FIG. 3) of the sealing part 213. The power supply terminal 214 is electrically connected with the busbar of the busbar assembly 212. Moreover, the power supply terminal 214 is also electrically connected to a positive terminal of the battery 5 (see FIG. 2) via an electric wire (not shown). In addition, the first control module 21 is fixed, at a position between the sealing part 213 and the power supply terminal 214, to the first frame 11 by means of a bolt 201.

The connection part 215 is provided on the opposite side of the sealing part 213 to the power supply terminal 214 (i.e., the right side of the sealing part 213 in FIG. 3). The connection part 215 is fixed to the first frame 11 by means of a bolt 202.

The second control module 23 is an assembly of components for forming the first inverter circuit, a second inverter circuit, the first rectification circuit and a second rectification circuit of the rotating electric machine 1. As shown in FIG. 3, the second control module 23 includes a power module 231, the aforementioned heat sink 24, and a busbar assembly 232.

The power module 231 is a switching element module which includes two switching elements for forming the first inverter circuit and the first rectification circuit and two switching elements for forming the second inverter circuit and the second rectification circuit, more particularly two MOSFETs 236 and 237 for forming the first inverter circuit and the first rectification circuit and two MOSFETs 238 and 239 for forming the second inverter circuit and the second rectification circuit as shown in FIG. 2 in the present embodiment. The MOSFETs 236 and 237 are electrically connected in series with each other such that the source of the MOSFET 236 is electrically connected to the drain of the MOSFET 237. Similarly, the MOSFETs 238 and 239 are electrically connected in series with each other such that the source of the MOSFET 238 is electrically connected to the drain of the MOSFET 239.

As shown in FIG. 3, the heat sink 24 is provided on the rotation axis CAO side of the power module 231, i.e., on the radially inner side of the power module 231. In other words, the heat sink 24 is located closer than the power module 231 to the rotation axis CAO of the rotating shaft 15. The heat sink 24 is made of metal and configured to dissipate heat generated in the power module 231. More specifically, as shown in FIG. 4, the heat sink 24 is configured to have a base part 241, a plurality of fins 242 and a contact part 243.

The base part 241 is plate-shaped and has a larger thickness than each of the fins 242. The base part 241 is provided, on the rotation axis CAO side (i.e., on the radially inner side) of the power module 231, to abut the power module 231.

The fins 242 are formed on the rotation axis CAO side of the base part 241. As shown in FIG. 3, the fins 242 are substantially plate-shaped and arranged parallel with each other in a direction substantially perpendicular to the rotation axis CAO of the rotating shaft 15 with gaps formed therebetween.

As shown in FIG. 4, the contact part 243 is formed on the first control module 21 side of that one of the fins 242 which is located closest to the first control module 21 in the fins 242. In addition, for the sake of facilitating understanding, that one of the fins 242 which is located closest to the first control module 21 in the fins 242 is designated by the reference numeral 244 in FIG. 4.

Figure 5:
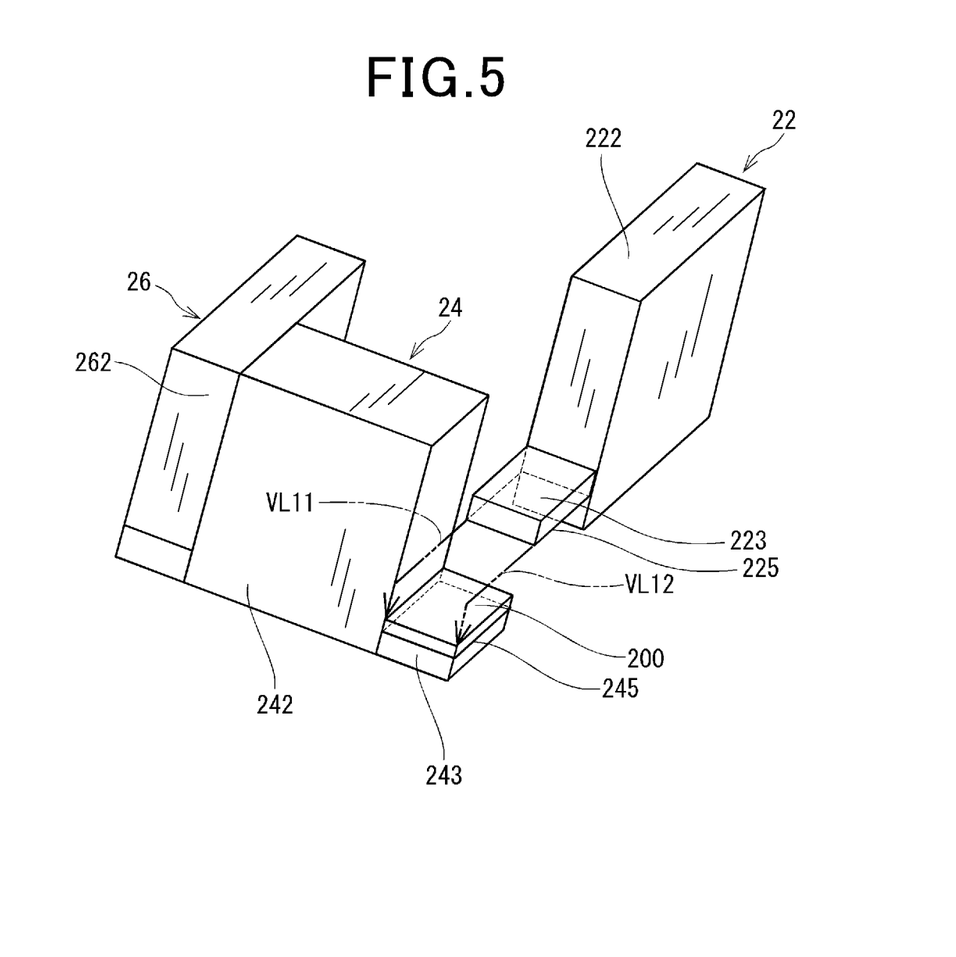
FIG. 5 is a schematic view illustrating the configuration of the heat sinks.

The contact part 243 has a contact surface 245 for making contact with the contact part 223 of the heat sink 22 of the first control module 21. As shown in FIG. 5, on the contact surface 245, there is provided a thermally-conductive adhesive 200 that corresponds to a □joining member□.

The busbar assembly 232 is an assembly of components for insulating and wiring the power module 231. The busbar assembly 232 includes a busbar (not shown) electrically connected with the power module 231, a sealing part 233, and connection parts 234 and 235.

The sealing part 233 is formed of resin to fix and seal the busbar of the busbar assembly 232.

The connection part 234 is provided on one side (i.e., the upper side in FIG. 3) of the sealing part 233. The connection part 234 is fixed, together with the connection part 215 of the first control module 21, to the first frame 11 by means of the bolt 202.

The connection part 235 is provided on the opposite side of the sealing part 233 to the connection part 234 (i.e., the lower side of the sealing part 233 in FIG. 3). The connection part 235 is fixed to the first frame 11 by means of a bolt 203.

The third control module 25 is an assembly of components for forming the second inverter circuit and the second rectification circuit of the rotating electric machine 1. As shown in FIG. 3, the third control module 25 includes a power module 251, the aforementioned heat sink 26, and a busbar assembly 252.

The power module 251 is a switching element module which includes four switching elements for forming the second inverter circuit and the second rectification circuit, more particularly four MOSFETs 256, 257, 258 and 259 as shown in FIG. 2 in the present embodiment. The MOSFETs 256 and 257 are electrically connected in series with each other such that the source of the MOSFET 256 is electrically connected to the drain of the MOSFET 257. Similarly, the MOSFETs 258 and 259 are electrically connected in series with each other such that the source of the MOSFET 258 is electrically connected to the drain of the MOSFET 259.

As shown in FIG. 3, the heat sink 26 is provided on the rotation axis CAO side of the power module 251, i.e., on the radially inner side of the power module 251. In other words, the heat sink 26 is located closer than the power module 251 to the rotation axis CAO of the rotating shaft 15. The heat sink 26 is made of metal and configured to dissipate heat generated in the power module 251. More specifically, as shown in FIG. 4, the heat sink 26 is configured to have a base part 261 and a plurality of fins 262.

The base part 261 is plate-shaped and has a larger thickness than each of the fins 262. The base part 261 is provided, on the rotation axis CAO side (i.e., on the radially inner side) of the power module 251, to abut the power module 251.

The fins 262 are formed on the rotation axis CAO side of the base part 261. As shown in FIG. 3, the fins 262 are substantially plate-shaped and arranged parallel with each other in a direction substantially perpendicular to the rotation axis CAO of the rotating shaft 15 with gaps formed therebetween.

The busbar assembly 252 is an assembly of components for insulating and wiring the power module 251. The busbar assembly 252 includes a busbar (not shown) electrically connected with the power module 251, a sealing part 253, and a connection part 254.

The sealing part 253 is formed of resin to fix and seal the busbar of the busbar assembly 252.

The connection part 254 is provided on one side (i.e., the right side in FIG. 3) of the sealing part 253. The connection part 254 is fixed, together with the connection part 235 of the second control module 23, to the first frame 11 by means of the bolt 203.

The slip rings 27 and the brushes 28 are provided for supplying direct current (i.e., excitation current) to the rotor coil 142. Each of the slip rings 27 is fixed to an outer circumferential surface of the rotating shaft 15 via an insulating member. The brushes 28 are held by a brush holder 282 so that each of the brushes 28 has its distal end surface in pressed contact with an outer circumferential surface of a corresponding one of the slip rings 27. More specifically, each of the brushes 28 is pressed against the outer circumferential surface of the corresponding slip ring 27 by a spring 281 provided in the brush holder 282.

The cover 30 is provided to cover the control section 20 from the opposite side of the control section 20 to the first frame 11 (i.e., on the outside of the first frame 11), thereby protecting the control section 20 from foreign substances such as water and dust. In addition, the cover 30 is made of resin.

Next, a manufacturing method of the rotating electric machine 1 according to the present embodiment will be described.

In the present embodiment, the manufacturing method of the rotating electric machine 1 includes a first assembly step, a second assembly step and a fixing step. In the first assembly step, the second control module 23 is assembled to the bottom part 111 of the first frame 11 from the opposite side of the bottom part 111 to the accommodation space 100. In the second assembly step, the first and third control modules 21 and 25 are assembled to the bottom part 111 of the first frame 11 so as to be located adjacent to the second control module 23 respectively on opposite sides of the second control module 23. In the fixing step, the first, second and third control modules 21, 23 and 25 are fixed to the bottom part 111 of the first frame 11 by means of the bolts 201, 202 and 203.

More specifically, in the second assembly step, the first control module 21 is assembled to the bottom part 111 of the first frame 11 so as to bring the contact surface 225 of the contact part 223 of the heat sink 22 of the first control module 21 into surface contact with the contact surface 245 of the contact part 243 of the heat sink 24 of the second control module 23, as indicated with imaginary lines VL11 and VL12 in FIG. 5. Moreover, as described previously, on the contact surface 245 of the contact part 243 of the heat sink 24, there is provided the thermally-conductive adhesive 200. Consequently, the contact surface 225 of the contact part 223 of the heat sink 22 and the contact surface 245 of the contact part 243 of the heat sink 24 are joined (or bonded) together by the thermally-conductive adhesive 200 so as to be in surface contact with each other.

In addition, the term □surface contact□ denotes the contact between two objects over a certain contact area therebetween, and thus is different from □point contact□. That is, within the contact area, substantially no point on one of the two objects is out of contact with the other of the two objects.

Next, operation of the rotating electric machine 1 will be described with reference to FIGS. 1 and 2.

As described previously, in the present embodiment, the rotating electric machine 1 is configured as a motor-generator to selectively operate in a motor mode and a generator mode in a vehicle.

In the motor mode, upon an ignition switch (not shown) of the vehicle being turned on, direct current is supplied from the battery 5 to the rotor coil 142 via the brushes 28 and the slip rings 27, causing magnetic poles to be formed on a radially outer periphery of the rotor 14. At the same time, direct current is also supplied from the battery 5 to the power modules 211, 231 and 251. Then, the six MOSFETs 216, 217, 218, 219, 236 and 237, which together form the first inverter circuit, are turned on or off at predetermined timings, thereby converting the direct current supplied from the battery 5 into three-phase alternating current. Similarly, the six MOSFETs 238, 239, 256, 257, 258 and 259, which together form the second inverter circuit, are also turned on or off at predetermined timings, thereby converting the direct current supplied from the battery 5 into three-phase alternating current. However, the predetermined timings at which the six MOSFETs forming the second inverter circuit are turned on or off are different from the predetermined timings at which the six MOSFETs forming the first inverter circuit are turned on or off. Consequently, the three-phase alternating current outputted from the second inverter circuit is different in phase from the three-phase alternating current outputted from the first inverter circuit. The three-phase alternating current outputted from the first inverter circuit and the three-phase alternating current outputted from the second inverter circuit are respectively supplied to the first and second three-phase stator coils 133 and 134, causing the machine main body 10 to generate drive power for driving the vehicle.

In the generator mode, direct current is supplied from the battery 5 to the rotor coil 142 via the brushes 28 and the slip rings 27, causing magnetic poles to be formed on the radially outer periphery of the rotor 14. Moreover, drive power is transmitted from the crankshaft of the engine of the vehicle to the connection part 121 of the machine main body 10, causing three-phase alternating current to be generated in each of the first and second three-phase stator coils 133 and 134. Then, the six MOSFETs 216, 217, 218, 219, 236 and 237, which together form the first rectification circuit, are turned on or off at predetermined timings, thereby rectifying the three-phase alternating current generated in the first three-phase stator coil 133 into direct current. Similarly, the six MOSFETs 238, 239, 256, 257, 258 and 259, which together form the second rectification circuit, are also turned on or off at predetermined timings, thereby rectifying the three-phase alternating current generated in the second three-phase stator coil 134 into direct current. Both the direct current outputted from the first rectification circuit and the direct current outputted from the second rectification circuit are supplied to the battery 5 to charge it.

According to the present embodiment, it is possible to achieve the following advantageous effects.

In the rotating electric machine 1 according to the present embodiment, the first and second control modules 21 and 23 are joined, by the thermally-conductive adhesive 200, to be in surface contact with each other. Consequently, when one of the control modules 21 and 23 undergoes abnormal heat generation exceeding the heat dissipation capability of the one of the control modules 21 and 23, heat can be easily transferred from the one of the control modules 21 and 23 to the other of the control modules 21 and 23. As a result, the one of the control modules 21 and 23 which undergoes the abnormal heat generation can be prevented from being damaged due to the abnormal heat generation.

For example, in a reverse connection test of the rotating electric machine 1, electric power of a relatively high voltage is inputted to the first control module 21 via the power supply terminal 214. Consequently, a large amount of heat, which exceeds the heat dissipation capability of the first control module 21, may be generated in the first control module 21. However, in this case, heat generated in the first control module 21 will be transferred to the second control module 23 via the contact parts 223 and 243 of the heat sinks 22 and 24 of the first and second control modules 21 and 23; the contact parts 223 and 243 are in surface contact with each other. As a result, the first control module 21 can be prevented from being damaged due to the heat generated therein.

As above, in the rotating electric machine 1 according to the present embodiment, when the amount of heat generated in one of the first and second control modules 21 and 23 exceeds the heat dissipation capability of the one of the control modules 21 and 23, the heat can be easily transferred to the other of the control modules 21 and 23, thereby preventing the one of the control modules 21 and 23 from being damaged due to the heat generated therein.

Moreover, during normal operation of the rotating electric machine 1, even if there is variation between the heat dissipation capabilities of the control modules, the heat dissipation capabilities of the control modules can be mutually supplemented, thereby eliminating imbalance of heat dissipation in the control section 20.

In the rotating electric machine 1 according to the present embodiment, the contact part 223 of the heat sink 22 of the first control module 21 and the contact part 243 of the heat sink 24 of the second control module 23 are joined (or bonded) to each other by the thermally-conductive adhesive 200. Consequently, the contact part 223 of the heat sink 22 of the first control module 21 and the contact part 243 of the heat sink 24 of the second control module 23 are prevented from being thermally insulated from each other as well as from being separated from each other. As a result, heat can be reliably transferred between the first and second control modules 21 and 23, thereby preventing each of the first and second control modules 21 and 23 from being damaged due to heat generated therein.

In the rotating electric machine 1 according to the present embodiment, the contact part 223 of the heat sink 22 of the first control module 21 has the contact surface 225, and the contact part 243 of the heat sink 24 of the second control module 23 has the contact surface 245. The contact surface 225 of the contact part 223 and the contact surface 245 of the contact part 243 are in surface contact with each other. Consequently, it becomes possible to arrange the contact part 223 of the heat sink 22 of the first control module 21 and the contact part 243 of the heat sink 24 of the second control module 23 to be in contact with each other over a certain contact area therebetween. As a result, it becomes possible to secure a relatively large heat transfer area between the first and second control modules 21 and 23, thereby reliably preventing each of the first and second control modules 21 and 23 from being damaged due to heat generated therein.

In the rotating electric machine 1 according to the present embodiment, the contact surface 225 of the first control module 21 and the contact surface 245 of the second control module 23 are formed respectively in the heat sink 22 of the first control module 21 and the heat sink 24 of the second control module 23. Moreover, both the heat sinks 22 and 24 of the first and second control modules 21 and 23 are made of metal and thus have high thermal conductivity. Consequently, heat can be easily transferred between the first and second control modules 21 and 23, thereby reliably preventing each of the first and second control modules 21 and 23 from being damaged due to heat generated therein.

Second Embodiment

A rotating electric machine 1 according to the second embodiment has a similar structure to the rotating electric machine 1 according to the first embodiment. Therefore, only the differences therebetween will be described hereinafter.

Figure 6:
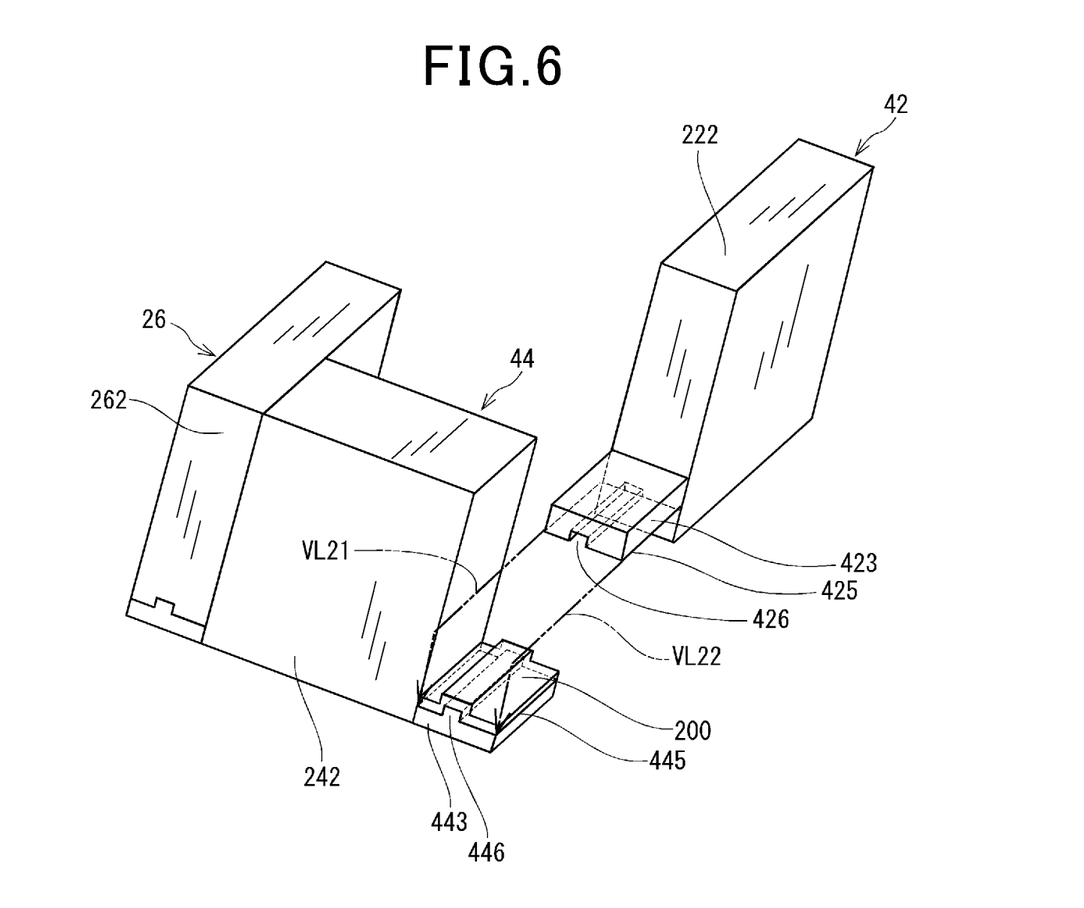
FIG. 6 is a schematic view illustrating the configuration of heat sinks employed in a rotating electric machine according to a second embodiment.

In the present embodiment, the first and second control modules 21 and 23 respectively include a heat sink 42 and a heat sink 44 as shown in FIG. 6, instead of the heat sinks 22 and 24 described in the first embodiment.

Similar to the heat sink 22 described in the first embodiment, the heat sink 42 is provided on the rotation axis CAO side (i.e., the radially inner side) of the power module 211. The heat sink 42 is made of metal and configured to dissipate heat generated in the power module 211. More specifically, though not shown in the figures, the heat sink 42 is configured to have a base part 221, a plurality of fins 222 and a contact part 423.

The contact part 423 is formed on the second control module 23 side of that one of the fins 222 which is located closest to the second control module 23 in the fins 222.

The contact part 423 has a contact surface 425 for making contact with a contact part 443 of the heat sink 44 of the second control module 23 which will be described in detail later. As shown in FIG. 6, in the contact surface 425, there is formed a concave groove 426 that extends in a direction away from the fins 222 toward the contact part 443 of the heat sink 44.

On the other hand, similar to the heat sink 24 described in the first embodiment, the heat sink 44 is provided on the rotation axis CAO side (i.e., the radially inner side) of the power module 231. The heat sink 44 is made of metal and configured to dissipate heat generated in the power module 231. More specifically, though not shown in the figures, the heat sink 44 is configured to have a base part 241, a plurality of fins 242 and a contact part 443.

The contact part 443 is formed on the first control module 21 side of that one of the fins 242 which is located closest to the first control module 21 in the fins 242.

The contact part 443 has a contact surface 445 for making contact with the contact part 423 of the heat sink 42 of the first control module 21. As shown in FIG. 6, on the contact surface 445, there is formed a convex ridge 446 that extends substantially parallel to side surfaces of the fins 242. In addition, the ridge 446 is formed so as to be fitted into and engage with the groove 426 formed in the contact surface 425 of the contact part 423 of the heat sink 42.

Moreover, as shown in FIG. 6, on the contact surface 445 of the contact part 443 of the heat sink 44, there is provided a thermally-conductive adhesive 200.

In manufacturing the rotating electric machine 1 according to the present embodiment, in the second assembly step, as indicated with imaginary lines VL21 and VL22 in FIG. 6, the first control module 21 is assembled to the bottom part 111 of the first frame 11 so that: the contact surface 425 of the contact part 423 of the heat sink 42 of the first control module 21 is brought into surface contact with the contact surface 445 of the contact part 443 of the heat sink 44 of the second control module 23; and the ridge 446 formed on the contact surface 445 of the contact part 443 of the heat sink 44 is fitted into the groove 426 formed in the contact surface 425 of the contact part 423 of the heat sink 42. Moreover, as described above, on the contact surface 445 of the contact part 443 of the heat sink 44, there is provided the thermally-conductive adhesive 200. Consequently, the contact surface 425 of the contact part 423 of the heat sink 42 and the contact surface 445 of the contact part 443 of the heat sink 44 are joined (or bonded) together by the thermally-conductive adhesive 200 so as to be in surface contact with each other.

According to the present embodiment, it is possible to achieve the same advantageous effects as described in the first embodiment.

Moreover, in the rotating electric machine 1 according to the present embodiment, the ridge 446 formed on the contact surface 445 of the contact part 443 of the heat sink 44 is fitted in and thus engages with the groove 426 formed in the contact surface 425 of the contact part 423 of the heat sink 42. Consequently, the contact area between the contact part 423 of the heat sink 42 of the first control module 21 and the contact part 443 of the heat sink 44 of the second control module 23 is increased. As a result, heat can be more easily transferred between the first and second control modules 21 and 23, thereby more reliably preventing each of the first and second control modules 21 and 23 from being damaged due to heat generated therein.

Third Embodiment

A rotating electric machine 1 according to the third embodiment has a similar structure to the rotating electric machine 1 according to the first embodiment. Therefore, only the differences therebetween will be described hereinafter.

Figure 7:
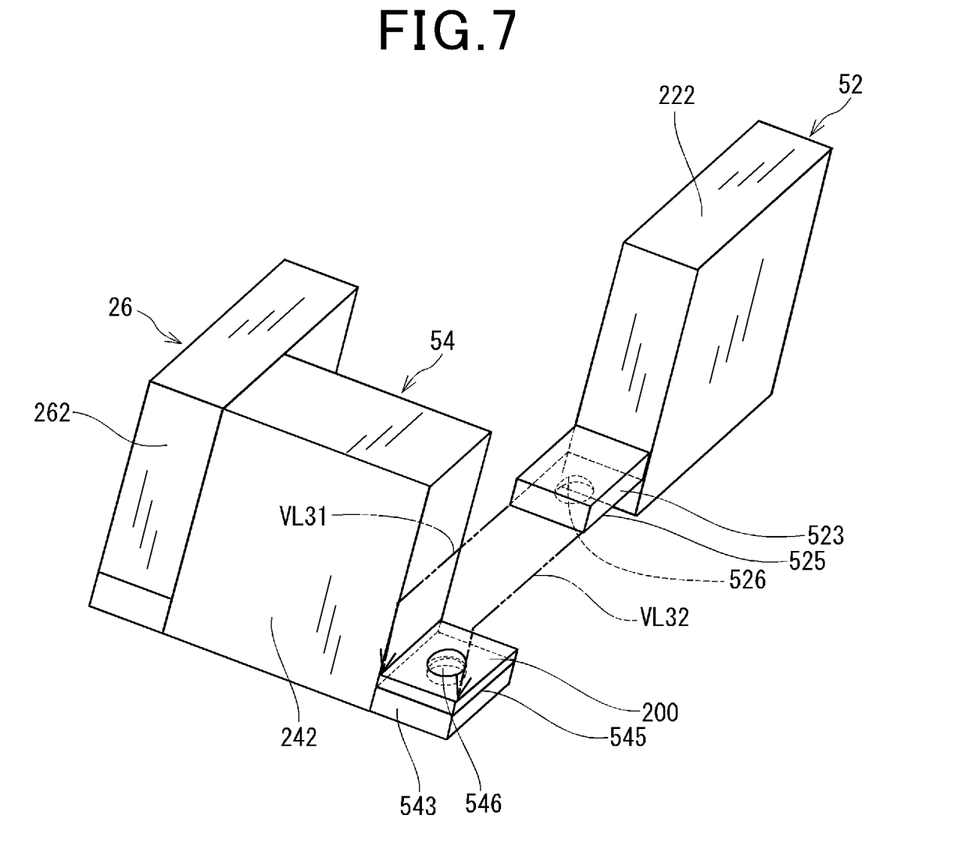
FIG. 7 is a schematic view illustrating the configuration of heat sinks employed in a rotating electric machine according to a third embodiment.

In the present embodiment, the first and second control modules 21 and 23 respectively include a heat sink 52 and a heat sink 54 as shown in FIG. 7, instead of the heat sinks 22 and 24 described in the first embodiment.

Similar to the heat sink 22 described in the first embodiment, the heat sink 52 is provided on the rotation axis CAO side (i.e., the radially inner side) of the power module 211.

The heat sink 52 is made of metal and configured to dissipate heat generated in the power module 211. More specifically, though not shown in the figures, the heat sink 52 is configured to have a base part 221, a plurality of fins 222 and a contact part 523.

The contact part 523 is formed on the second control module 23 side of that one of the fins 222 which is located closest to the second control module 23 in the fins 222.

The contact part 523 has a contact surface 525 for making contact with a contact part 543 of the heat sink 54 of the second control module 23 which will be described in detail later. As shown in FIG. 7, in the contact surface 525, there is formed a substantially hemispherical recess 526.

On the other hand, similar to the heat sink 24 described in the first embodiment, the heat sink 54 is provided on the rotation axis CAO side (i.e., the radially inner side) of the power module 231. The heat sink 54 is made of metal and configured to dissipate heat generated in the power module 231. More specifically, though not shown in the figures, the heat sink 54 is configured to have a base part 241, a plurality of fins 242 and a contact part 543.

The contact part 543 is formed on the first control module 21 side of that one of the fins 242 which is located closest to the first control module 21 in the fins 242.

The contact part 543 has a contact surface 545 for making contact with the contact part 523 of the heat sink 52 of the first control module 21. As shown in FIG. 7, on the contact surface 545, there is formed a substantially hemispherical protrusion 546. In addition, the protrusion 546 is formed so as to be fitted into and engage with the recess 526 formed in the contact surface 525 of the contact part 523 of the heat sink 52.

Moreover, as shown in FIG. 7, on the contact surface 545 of the contact part 543 of the heat sink 54, there is provided a thermally-conductive adhesive 200.

In manufacturing the rotating electric machine 1 according to the present embodiment, in the second assembly step, as indicated with imaginary lines VL31 and VL32 in FIG. 7, the first control module 21 is assembled to the bottom part 111 of the first frame 11 so that: the contact surface 525 of the contact part 523 of the heat sink 52 of the first control module 21 is brought into surface contact with the contact surface 545 of the contact part 543 of the heat sink 54 of the second control module 23; and the protrusion 546 formed on the contact surface 545 of the contact part 543 of the heat sink 54 is fitted into the recess 526 formed in the contact surface 525 of the contact part 523 of the heat sink 52. Moreover, as described above, on the contact surface 545 of the contact part 543 of the heat sink 54, there is provided the thermally-conductive adhesive 200. Consequently, the contact surface 525 of the contact part 523 of the heat sink 52 and the contact surface 545 of the contact part 543 of the heat sink 54 are joined (or bonded) together by the thermally-conductive adhesive 200 so as to be in surface contact with each other.

According to the present embodiment, it is possible to achieve the same advantageous effects as described in the first embodiment.

Moreover, in the rotating electric machine 1 according to the present embodiment, the protrusion 546 formed on the contact surface 545 of the contact part 543 of the heat sink 54 is fitted in and thus engages with the recess 526 formed in the contact surface 525 of the contact part 523 of the heat sink 52. Consequently, the contact area between the contact part 523 of the heat sink 52 of the first control module 21 and the contact part 543 of the heat sink 54 of the second control module 23 is increased. As a result, heat can be more easily transferred between the first and second control modules 21 and 23, thereby more reliably preventing each of the first and second control modules 21 and 23 from being damaged due to heat generated therein.

Fourth Embodiment

A rotating electric machine 1 according to the fourth embodiment has a similar structure to the rotating electric machine 1 according to the first embodiment. Therefore, only the differences therebetween will be described hereinafter.

Figure 8:
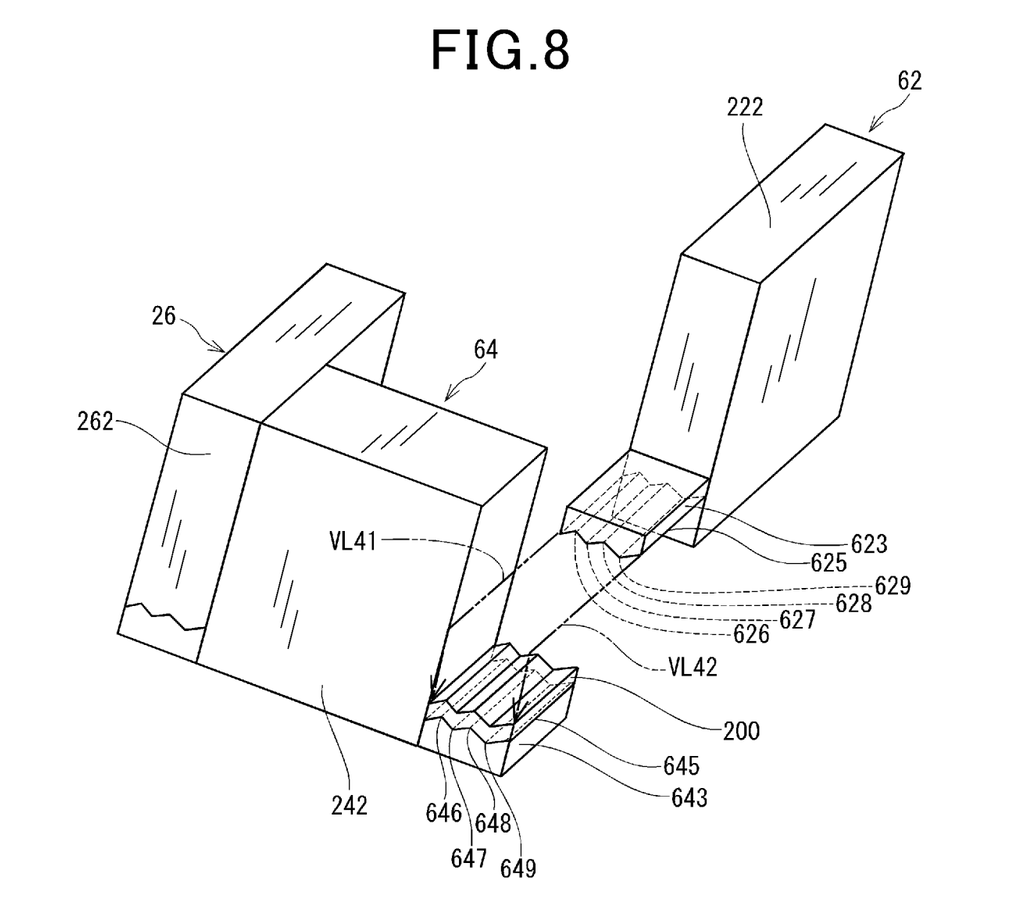
FIG. 8 is a schematic view illustrating the configuration of heat sinks employed in a rotating electric machine according to a fourth embodiment.

In the present embodiment, the first and second control modules 21 and 23 respectively include a heat sink 62 and a heat sink 64 as shown in FIG. 8, instead of the heat sinks 22 and 24 described in the first embodiment.

Similar to the heat sink 22 described in the first embodiment, the heat sink 62 is provided on the rotation axis CAO side (i.e., the radially inner side) of the power module 211. The heat sink 62 is made of metal and configured to dissipate heat generated in the power module 211. More specifically, though not shown in the figures, the heat sink 62 is configured to have a base part 221, a plurality of fins 222 and a contact part 623.

The contact part 623 is formed on the second control module 23 side of that one of the fins 222 which is located closest to the second control module 23 in the fins 222.

The contact part 623 has a contact surface 625 for making contact with a contact part 643 of the heat sink 64 of the second control module 23 which will be described in detail later. As shown in FIG. 8, on the contact surface 625, there formed a plurality of concave grooves and a plurality of convex ridges, more particularly two concave grooves 626 and 628 and two convex ridges 627 and 629 in the present embodiment. All of the grooves 626 and 628 and the ridges 627 and 629 extend in a direction away from the fins 222 toward the contact part 643 of the heat sink 64. Moreover, the grooves 626 and 628 are formed alternately with the ridges 627 and 629.

On the other hand, similar to the heat sink 24 described in the first embodiment, the heat sink 64 is provided on the rotation axis CAO side (i.e., the radially inner side) of the power module 231. The heat sink 64 is made of metal and configured to dissipate heat generated in the power module 231. More specifically, though not shown in the figures, the heat sink 64 is configured to have a base part 241, a plurality of fins 242 and a contact part 643.

The contact part 643 is formed on the first control module 21 side of that one of the fins 242 which is located closest to the first control module 21 in the fins 242.

The contact part 643 has a contact surface 645 for making contact with the contact part 623 of the heat sink 62 of the first control module 21. As shown in FIG. 8, on the contact surface 645, there formed a plurality of convex ridges and a plurality of concave grooves, more particularly two convex ridges 646 and 648 and two concave grooves 647 and 649 in the present embodiment. All of the ridges 646 and 648 and the grooves 647 and 649 extend substantially parallel to side surfaces of the fins 242. Moreover, the ridges 646 and 648 are formed alternately with the grooves 647 and 649. In addition, the ridges 646 and 648 and the grooves 647 and 649 are formed so as to respectively engage with the grooves 626 and 628 and the ridges 627 and 629 formed on the contact surface 625 of the contact part 623 of the heat sink 62.

Moreover, as shown in FIG. 8, on the contact surface 645 of the contact part 643 of the heat sink 64, there is provided a thermally-conductive adhesive 200.

In manufacturing the rotating electric machine 1 according to the present embodiment, in the second assembly step, as indicated with imaginary lines VL41 and VL42 in FIG. 8, the first control module 21 is assembled to the bottom part 111 of the first frame 11 so that: the contact surface 625 of the contact part 623 of the heat sink 62 of the first control module 21 is brought into surface contact with the contact surface 645 of the contact part 643 of the heat sink 64 of the second control module 23; and the grooves 626 and 628 and the ridges 627 and 629 formed on the contact surface 625 of the contact part 623 of the heat sink 62 are respectively brought into engagement with the ridges 646 and 648 and the grooves 647 and 649 formed on the contact surface 645 of the contact part 643 of the heat sink 64. Moreover, as described above, on the contact surface 645 of the contact part 643 of the heat sink 64, there is provided the thermally-conductive adhesive 200. Consequently, the contact surface 625 of the contact part 623 of the heat sink 62 and the contact surface 645 of the contact part 643 of the heat sink 64 are joined (or bonded) together by the thermally-conductive adhesive 200 so as to be in surface contact with each other.

According to the present embodiment, it is possible to achieve the same advantageous effects as described in the first embodiment.

Moreover, in the rotating electric machine 1 according to the present embodiment, the grooves 626 and 628 and the ridges 627 and 629 formed on the contact surface 625 of the contact part 623 of the heat sink 62 are respectively in engagement with the ridges 646 and 648 and the grooves 647 and 649 formed on the contact surface 645 of the contact part 643 of the heat sink 64. Consequently, the contact area between the contact part 623 of the heat sink 62 of the first control module 21 and the contact part 643 of the heat sink 64 of the second control module 23 is increased. As a result, heat can be more easily transferred between the first and second control modules 21 and 23, thereby more reliably preventing each of the first and second control modules 21 and 23 from being damaged due to heat generated therein.

While the above particular embodiments have been shown and described, it will be understood by those skilled in the art that various modifications, changes, and improvements may be made without departing from the spirit of the present disclosure.

For example, in the above-described embodiments, the rotting electric machine 1 is designed to be used in a vehicle. However, the present disclosure can also be applied to rotating electric machines for other uses.

In the above-described embodiments, of the first, second and third control modules 21, 23 and 25, the first and second control modules 21 and 23 are arranged in surface contact with each other. As an alternative, instead of the first and second control modules 21 and 23, the second and third control modules 23 and 25 may be arranged in surface contact with each other. As another alternative, the second and third control modules 23 and 25 may be arranged in surface contact with each other while the first and second control modules 21 and 23 are arranged in surface contact with each other.

In the above-described embodiments, the contact parts of the heat sinks of the first and second control modules 21 and 23 are joined by the thermally-conductive adhesive 200 so as to be in surface contact with each other. However, the contact parts of the heat sinks of the first and second control modules 21 and 23 may alternatively be joined by other joining members, such as a weld formed therebetween.

In the above-described embodiments, the thermally-conductive adhesive 200 is provided (or applied) on the contact surface of the contact part of the heat sink of the second control module 23. However, the thermally-conductive adhesive 200 may alternatively be provided on the contact surface of the contact part of the heat sink of the first control module 21.

In the above-described embodiments, there are provided the dedicated contact surfaces in the heat sinks of the first and second control modules 21 and 23. However, the heat sinks of the first and second control modules 21 and 23 may alternatively be arranged in surface contact with each other in other manners without providing the dedicated contact surfaces therein.

In the above-described embodiments, the contact surfaces are provided in the heat sinks of the first and second control modules 21 and 23. However, the contact surfaces may alternatively be provided in other parts of the first and second control modules 21 and 23.

In the above-described embodiments, the MOSFETs are employed in the power modules 211, 231 and 251. However, other switching elements, such as diodes, may alternatively be employed in the power modules 211, 231 and 251.

In the above-described embodiments, the stator 13 includes two three-phase stator coils, i.e., the first three-phase stator coil 133 and the second three-phase stator coil 134. Moreover, the MOSFETs forming the first inverter circuit that converts the direct current supplied from the battery 5 into the three-phase alternating current supplied to the first three-phase stator coil 133 are turned on or off at different predetermined timings from the MOSFETs forming the second inverter circuit that converts the direct current supplied from the battery 5 into the three-phase alternating current supplied to the second three-phase stator coil 134. However, the stator 13 may alternatively include only one three-phase stator coil.

In addition, in the above-described embodiments, by turning on or off the MOSFETs forming the first inverter circuit at different predetermined timings from the MOSFETs forming the second inverter circuit, it is possible to reduce noise included in the three-phase alternating currents outputted from the first and second inverter circuits.

What is claimed is:

1. A rotating electric machine comprising:
a rotating shaft that rotates about a rotation axis;
a rotor fixed to the rotating shaft;
a stator including a stator coil;
a housing that accommodates both the rotor and the stator therein;
a plurality of control modules configured to supply multi-phase alternating current to the stator coil and rectifying multi-phase alternating current generated in the stator coil into direct current, the plurality of control modules including a first control module and a second control module that are arranged adjacent to each other in a circumferential direction of the rotating shaft around the rotation axis of the rotating shaft; and
a joining member by which the first and second control modules are joined to be in surface contact with each other,
wherein
each of the control modules includes a plurality of switching elements electrically connected with the stator coil, and a heat sink provided to dissipate heat generated in the switching elements,
each of the heat sinks of the first and second control modules has a plurality of fins and a contact part, and
the heat sinks of the first and second control modules are arranged to have only the contact parts thereof overlapping and in surface contact with each other in an axial direction of the rotating shaft.

2. The rotating electric machine as set forth in claim 1, wherein the joining member is a thermally-conductive adhesive.

3. The rotating electric machine as set forth in claim 1, wherein each of the first and second control modules has a contact surface formed in the contact part of the heat sink thereof, and
the contact surfaces of the first and second control modules are in surface contact with each other.

4. The rotating electric machine as set forth in claim 3, wherein the contact surfaces of the first and second control modules are concave-convex-shaped to engage with each other.

* * * * *